(12) United States Patent
Rigmaiden

(10) Patent No.: US 6,525,653 B1
(45) Date of Patent: Feb. 25, 2003

(54) VEHICLE SECURITY AND MONITORING SYSTEM

(76) Inventor: Annie Rigmaiden, 535 Anton Blvd. Suite #300, Costa Mesa, CA (US) 92626

( * ) Notice: Subject to any disclaimer, the term of this patent is extended or adjusted under 35 U.S.C. 154(b) by 0 days.

(21) Appl. No.: 09/928,089

(22) Filed: Aug. 10, 2001

(51) Int. Cl.[7] .............................................. B60R 25/10
(52) U.S. Cl. ..................... 340/426; 340/937; 348/148; 348/152; 180/287; 307/10.2
(58) Field of Search ................... 340/426, 937; 348/113, 143, 148, 151, 152, 153, 154, 155; 180/287; 307/10.2

(56) References Cited

U.S. PATENT DOCUMENTS

| | | |
|---|---|---|
| 5,027,104 A | 6/1991 | Reid |
| 5,430,431 A | 7/1995 | Nelson |
| 5,917,405 A | 6/1999 | Joao |
| D411,850 S | 7/1999 | Riecken et al. |
| 5,939,975 A | 8/1999 | Tsuria et al. |
| 6,002,326 A * | 12/1999 | Turner ..................... 340/426 |
| 6,151,065 A | 11/2000 | Steed et al. ................. 348/148 |

* cited by examiner

*Primary Examiner*—Daryl Pope

(57) ABSTRACT

A vehicle security and monitoring system for protecting vehicles from theft and providing visual evidence of activity. The vehicle security and monitoring system includes an alarm assembly positioned within a vehicle including an audible alarm and a video assembly.

10 Claims, 2 Drawing Sheets

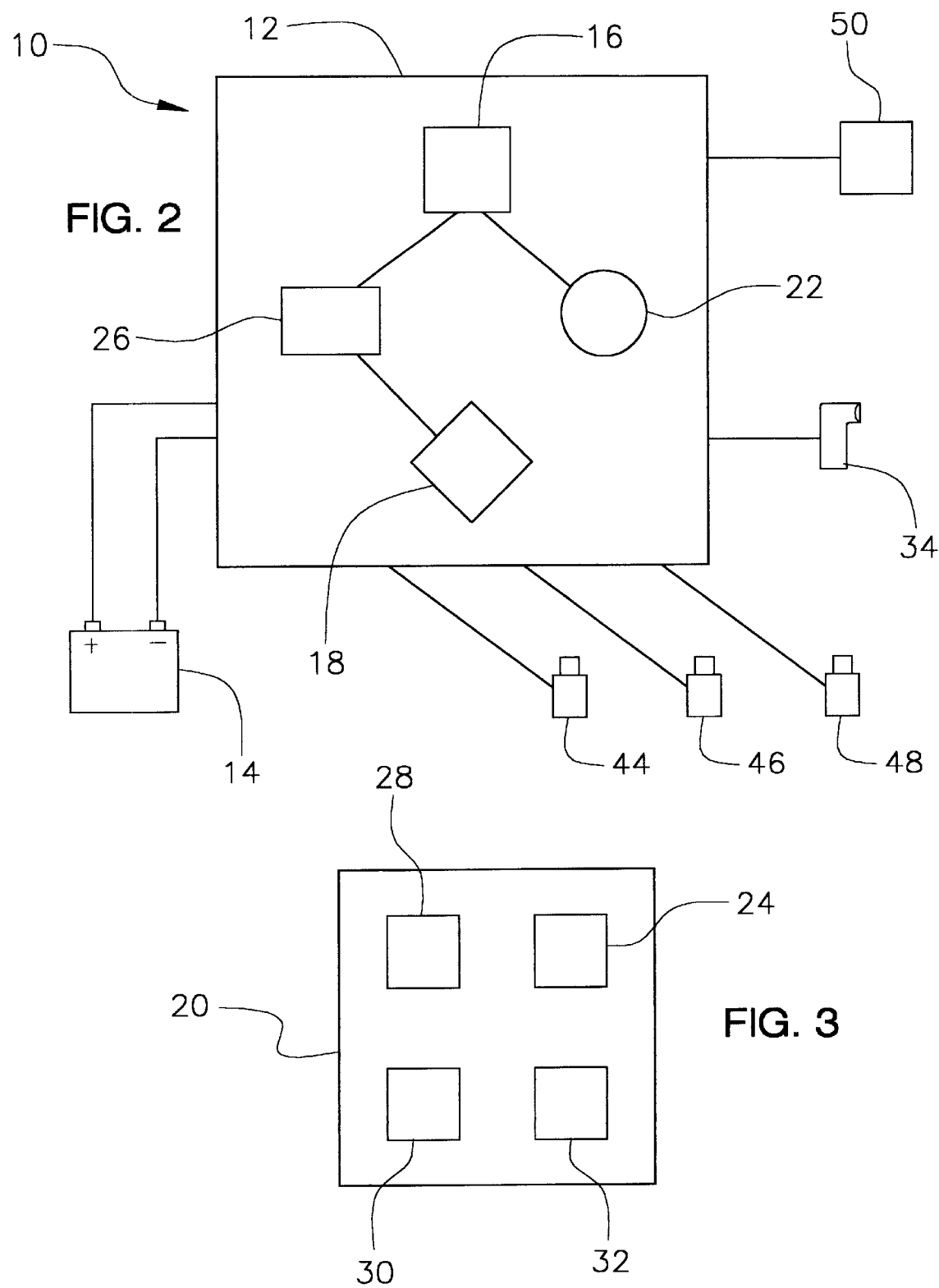

VEHICLE SECURITY AND MONITORING SYSTEM

BACKGROUND OF THE INVENTION

1. Field of the Invention

The present invention relates to car alarms and more particularly pertains to a new vehicle security and monitoring system for protecting vehicles from theft and providing visual evidence of activity.

2. Description of the Prior Art

The use of car alarms is known in the prior art. More specifically, car alarms heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 6,002,326; 5,939,975; 5,027,104; 5,430,431; 5,917,405; and U.S. Patent No. Des. 411,850.

While these devices fulfill their respective, particular objectives and requirements, the aforementioned patents do not disclose a new vehicle security and monitoring system. The inventive device includes an alarm assembly positioned within a vehicle including an audible alarm and a video assembly.

In these respects, the vehicle security and monitoring system according to the present invention substantially departs from the conventional concepts and designs of the prior art, and in so doing provides an apparatus primarily developed for the purpose of protecting vehicles from theft and providing visual evidence of activity.

SUMMARY OF THE INVENTION

In view of the foregoing disadvantages inherent in the known types of car alarms now present in the prior art, the present invention provides a new vehicle security and monitoring system construction wherein the same can be utilized for protecting vehicles from theft and providing visual evidence of activity.

The general purpose of the present invention, which will be described subsequently in greater detail, is to provide a new vehicle security and monitoring system apparatus and method which has many of the advantages of the car alarms mentioned heretofore and many novel features that result in a new vehicle security and monitoring system which is riot anticipated, rendered obvious, suggested, or even implied by any of the prior art car alarms, either alone or in any combination thereof.

To attain this, the present invention generally comprises an alarm assembly positioned within a vehicle including an audible alarm and a video assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle security and monitoring system apparatus and method which has many of the advantages of the car alarms mentioned heretofore and many novel features that result in a new vehicle a security and monitoring system which is not anticipated, rendered obvious, suggested, or even implied by any of the prior art car alarms, either alone or in any combination thereof.

It is another object of the present invention to provide a new vehicle security and monitoring system which may be easily and efficiently manufactured and marketed.

It is a further object of the present invention to provide a new vehicle security and monitoring system which is of a durable and reliable construction.

An even further object of the present invention is to provide a new vehicle security and monitoring system which is susceptible of a low cost of manufacture with regard to both materials and labor, and which accordingly is then susceptible of low prices of sale to the consuming public, thereby making such vehicle security and monitoring system economically available to the buying public.

Still yet another object of the present invention is to provide a new vehicle security and monitoring system which provides in the apparatuses and methods of the prior art some of the advantages thereof, while simultaneously overcoming some of the disadvantages normally associated therewith.

Still another object of the present invention is to provide a new vehicle security and monitoring system for protecting vehicles from theft and providing visual evidence of activity.

Yet another object of the present invention is to provide a new vehicle security and monitoring system which includes an alarm assembly positioned within a vehicle including an audible alarm and a video assembly.

Still yet another object of the present invention is to provide a new vehicle security and monitoring system that video tapes the intruder for the purpose of identification and apprehension.

Even still another object of the present invention is to provide a new vehicle security and monitoring system that has a transmitter to alert the owner of the vehicle at the time of break-in.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic view depicting the various components of the alarm assembly of a new vehicle security and monitoring system according to the present invention.

FIG. 3 is a schematic view depicting the various components of the receiver assembly of a new vehicle security and monitoring system according to the present invention.

DESCRIPTION OF THE PREFERRED EMBODIMENT

Figure 1:
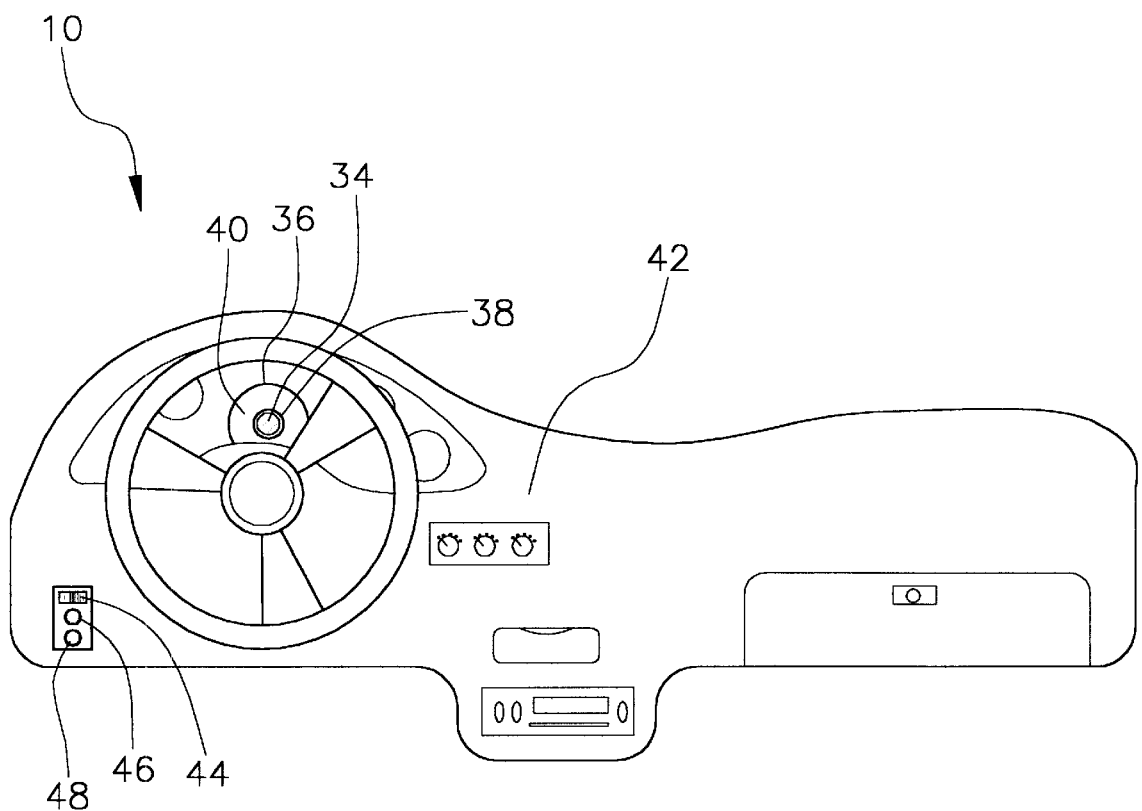
FIG. 1 is a schematic front view of a new vehicle security and monitoring system according to, the present invention.

With reference now to the drawings, and in particular to FIGS. 1 and 2, a new vehicle security and monitoring system embodying the principles and concepts of the present invention and generally designated by the reference numeral 10 will be described.

As best illustrated in FIGS. 1 and 2, the vehicle security and monitoring system 10 generally comprises an alarm assembly 12 that is coupled to the battery 14 of the vehicle. The alarm assembly 12 is positioned substantially within the vehicle providing an audible signal when an unauthorized entry is sensed.

A video assembly 16 is operationally coupled to the alarm assembly 12 such that when the alarm assembly 12 is triggered the video assembly 16 captures visual images of the interior of the vehicle.

A transmitter assembly 18 is operationally coupled to the alarm assembly 12 such that when the alarm assembly 12 is triggered, the transmitter assembly 18 transmits an activation radio signal.

A receiver assembly 20 designed for being carried by a person. The receiver assembly 20 is for remotely receiving the radio signal from the transmitter assembly 18 whereby a user is alerted to the alarm assembly 12 being triggered when the user is out of audible range but within range of the transmitter assembly 18.

A video signal transmitter 22 is operationally coupled to the video assembly 16 such that the captured visual images are transmitted in addition to the activation radio signal.

A video signal receiver 24 for remotely receiving the transmitted captured visual images, is positioned within the receiver assembly 20 such that the video signal receiver 24 is portable.

A remote activation receiver 26 is operationally coupled to the transmitter assembly 18 and the video assembly 16. The remote activation receiver 26 is for receiving a signal commanding transmission of a captured video image without activation of the alarm assembly 12 whereby a user may remotely monitor an interior of the vehicle.

A remote activation transmitter 28 is positioned within the receiver assembly 20 for transmitting a signal to the transmitter assembly 18 and the video assembly 16 via the remote activation receiver 26 commanding both the transmitter assembly 18 and the video assembly 16 to an active or inactive state.

An audible tone generator 30 provides an audible indication of activation of the alarm assembly 12.

A vibrator 32 provides a tactile indication of activation of the alarm assembly 12.

A camera 32 is positioned substantially behind a speedometer 36 of the vehicle. The speedometer 36 includes an aperture 38 extending through a face of the speedometer 40 such that a lens of the camera 32 is substantially hidden. The camera 32 is positioned to capture visual images of an interior of a passenger compartment from a dashboard 42 perspective.

A reset switch 44 deactivates the alarm assembly 12 and the video assembly 16. The reset switch 44 is positioned within the interior of the vehicle.

An activation switch 46 discretely activates the video unit without activating the alarm assembly 12. The activation switch 46 is positioned within the interior of the vehicle.

An emergency activation switch 48 activates both the video unit and the alarm assembly 12. The emergency activation switch 48 46 is positioned within the interior of the vehicle.

The alarm assembly 12 is operationally coupled to a lock 50 of the vehicle such that activating the lock 50 on the vehicle arms the alarm assembly 12 for use. Deactivating the lock 50 on the vehicle disarms the alarm assembly 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle security and monitoring system comprising:
an alarm assembly coupled to a battery of a vehicle, said alarm assembly being positioned substantially within said vehicle, said alarm assembly providing an audible signal when an unauthorized entry is sensed;
a video camera operationally coupled to said alarm assembly such that when said alarm assembly is triggered said video camera captures visual images of an interior of the vehicle;
an aperture being formed in said instrument panel;
a camera being positioned adjacent to said aperture and being directed toward an operator of the vehicle for viewing the operator of the vehicle;

said camera being positioned behind said instrument panel to hide said camera from view of the operator of the vehicle;

a transmitter assembly operationally coupled to said alarm assembly such that when said alarm assembly is triggered said transmitter assembly transmits an activation radio signal;

a receiver assembly adapted for being carried by a person, said receiver assembly being for remotely receiving said radio signal from said transmitter assembly whereby a user is alerted to said alarm assembly being triggered when the user is out of audible range but within range of the transmitter assembly;

a video signal transmitter being operationally coupled to said video camera such that said captured visual images are transmitted in addition to said activation radio signal;

a video signal receiver for remotely receiving said transmitted captured visual images;

wherein said video signal receiver is positioned within said receiver assembly such that said video signal receiver is portable;

a remote activation receiver being operationally coupled to said transmitter assembly and said video camera said remote activation receiver being for receiving a signal commanding transmission of a captured video image without activation of said alarm assembly whereby a user may remotely monitor an interior of the vehicle;

a remote activation transmitter positioned within said receiver assembly, said remote activation transmitter being for transmitting a signal to said transmitter assembly and said video camera via said remote activation receiver commanding both said transmitter assembly and said video camera to an active or inactive state;

an audible tone generator for providing an aural indication of activation of said alarm assembly;

a vibrator for providing a tactile indication of activation of said alarm assembly;

a reset switch for deactivating said alarm assembly and said video camera, said reset switch being positioned within the interior of the vehicle;

an activation switch for discretely activating said video camera without activating said alarm assembly, said activation switch being positioned within the interior of the vehicle;

an emergency activation switch for activating both said video camera and said alarm assembly, said emergency activation switch being positioned within the interior of the vehicle; and said alarm assembly being operationally coupled to a lock of the vehicle such that activating the lock on the vehicle arms said alarm assembly for use and deactivating the lock on the vehicle disarms said alarm assembly.

2. A vehicle security and monitoring system comprising:

an alarm assembly coupled to a battery of a vehicle, said alarm assembly being positioned substantially within said vehicle, said alarm assembly providing an audible signal when an unauthorized entry is sensed by an intruder, wherein an activation radio signal is activated in conjunction with said audible signal;

a video camera being operationally coupled to said alarm assembly such that when said alarm assembly is triggered said video camera captures visual images of an interior of the vehicle;

an aperture being formed in an instrument panel of the vehicle, said aperture being positioned generally in front of a driver's seat of the vehicle;

said video camera being positioned adjacent to said aperture and being directed rearwardly for viewing the intruder of the vehicle when the intruder is positioned in the driver's seat of the vehicle;

said video camera being positioned behind said instrument panel to hide said video camera from view of the operator of the vehicle;

a remote unit being adapted for being carried by a person, said remote unit including a remote receiver assembly for remotely receiving said activation radio signal from said alarm assembly such that a user is alerted to said alarm assembly being triggered;

said remote unit including a remote activation transmitter for transmitting a signal to said transmitter assembly and said video camera of said alarm assembly via said remote activation receiver of said alarm assembly commanding both said transmitter assembly and said video camera to an active or inactive state; and wherein said remote activation receiver of said alarm assembly receives said signal from said remote unit commanding transmission of a captured video image to said remote unit without activation of said alarm assembly such that a user is permitted to discretely monitor the interior of the vehicle remotely as desired.

3. The vehicle security and monitoring system of claim 2, wherein said transmitter assembly further comprises:

a video signal transmitter being operationally coupled to said video camera such that said captured visual images are transmitted to said receiver assembly in addition to said activation radio signal.

4. The vehicle security and monitoring system of claim 2, wherein said receiver assembly further comprises:

a video signal receiver for remotely receiving said transmitted captured visual images, and wherein said video signal receiver is positioned within said receiver assembly such that said video signal receiver is portable.

5. The vehicle security and monitoring system of claim 2, wherein said receiver assembly further comprises:

a audible tone generator for providing an aural indication of activation of said alarm assembly.

6. The vehicle security and monitoring system of claims 2, wherein said receiver assembly further comprises:

a vibrator for providing a tactile indication of activation of said alarm assembly.

7. The vehicle security and monitoring system of claim 2, further comprising:

a reset switch for deactivating said alarm assembly and said video camera, said reset switch being positioned within the interior of the vehicle.

8. The vehicle security and monitoring system of claim 2, further comprising:

an activation switch for discretely activating said video camera without activating said alarm assembly, said activation switch being positioned within the interior of the vehicle.

9. The vehicle security and monitored system of claim 2, further comprising:

an emergency activation switch for activating both said video camera and said alarm assembly, said emergency activation switch being positioned within he interior of the vehicle.

10. The vehicle security and monitoring system of claim 2, further comprising:

said alarm assembly being operationally coupled to a lock of the vehicle such that activating the lock on the vehicle arms said alarm assembly for use and deactivating the lock on the vehicle disarms said alarm assembly.

* * * * *